United States Patent [19]
Adams et al.

[11] Patent Number: 5,388,012
[45] Date of Patent: Feb. 7, 1995

[54] PARTITIONING OF MAGNETIC TAPE INTO SEQUENTIALLY OCCURRING PARTITIONS BETWEEN AND AROUND REGULARLY OCCURRING SYSTEM ZONES

[75] Inventors: Stephen M. Adams, Sachse, Tex.; Lionel C. Shih, San Jose, Calif.

[73] Assignees: E-Systems, Inc., Dallas, Tex.; Ampex Corporation, Redwood City, Calif.

[21] Appl. No.: 843,390

[22] Filed: Feb. 28, 1992

[51] Int. Cl.$^6$ ............... G11B 20/12; G11B 5/008
[52] U.S. Cl. ............... 360/48; 360/72.1; 364/DIG. 2; 364/952; 364/952.4; 364/952.6; 364/968.1; 364/968.3
[58] Field of Search ............... 360/48, 49, 72.1, 72.2; 395/600, 425; 369/275.3

[56] References Cited

U.S. PATENT DOCUMENTS

| | | | |
|---|---|---|---|
| 3,711,844 | 1/1973 | Irwin | 360/48 |
| 4,775,969 | 10/1988 | Osterlund | 369/53 |
| 4,899,232 | 2/1990 | Odaka et al. | 360/48 |
| 4,907,101 | 3/1990 | Keesen | 360/48 |
| 5,034,914 | 7/1991 | Osterlund | 360/48 X |

FOREIGN PATENT DOCUMENTS

| | | |
|---|---|---|
| 327188 | 8/1989 | European Pat. Off. . |
| 438305 | 7/1991 | European Pat. Off. . |
| 406188 | 1/1992 | European Pat. Off. . |
| 429727 | 6/1992 | European Pat. Off. . |

*Primary Examiner*—Paul V. Kulik
*Attorney, Agent, or Firm*—Harold E. Meier

[57] ABSTRACT

A method for formatting a length of magnetic tape into a plurality of partition areas to enable data storage in any of these areas and for formatting on the magnetic tape a plurality of spaced system zones, by means of controlling programs of a recording device prompting a host computer system to input the number and spacing of the system zones and the length and number of the partitions to be formatted onto the magnetic tape. The programs also prompts the host computer system to select one of various options for placing a partitions on the magnetic tape.

5 Claims, 5 Drawing Sheets

PARTITIONING OF MAGNETIC TAPE INTO SEQUENTIALLY OCCURRING PARTITIONS BETWEEN AND AROUND REGULARLY OCCURRING SYSTEM ZONES

TECHNICAL FIELD

This invention relates to the storage of data on a magnetic tape, and more specifically to the partitioning of a magnetic tape into sequentially occurring units of the same length in and around regularly occurring system zones.

BACKGROUND OF THE INVENTION

In the past, magnetic tape has been formatted using a single partition area, thus making the entire tape one long partition. At the beginning of the tape was a single system zone containing data regarding the format of the entire magnetic tape. This arrangement had several drawbacks.

First of all, data to be recorded on a magnetic tape must start at the beginning of a partition or it cannot later be retrieved. With only a single partition, data would always have to start at the beginning of a tape since this was the only area where data could commence being retrieved in an understandable manner. Since data could only be recorded starting at the recording medium beginning of a tape, only one related group of data could be stored on the tape at any one time. Unrelated data could not be stored on the same tape because the tape would not have a partition area at which to begin recording the unrelated data. This resulted many times in only the first portion of a tape being repeatedly used to store a single group of data. The remainder of the tape was wasted and never utilized.

Another disadvantage arose from the fact that tapes must always be loaded or unloaded at a system zone. Thus, when only a single partition and system zone are used, the tape must be completely rewound to the beginning to allow loading and unloading of the tape requiring additional time and effort on the part of the user of the tape.

Thus, a need has arisen for a method of tape volume partitioning that utilizes a substantially greater amount of the tape and allows for loading or unloading of a tape without complete rewinding.

SUMMARY OF THE INVENTION

The present invention overcomes the foregoing and other problems associated with the prior art by multiple partitioning a magnetic tape and placing system zones at sequentially placed locations throughout the length of the magnetic tape.

Controlling software of a peripheral recording device prompts a host computer system to instruct the recording device to format a tape with selectively spaced multiple system zones as designated by the host throughout the tape length. At the same time, the controlling software prompts the host system to designate the number and length of partitions to be formatted onto a magnetic tape by the recording device.

Multiple system zones create a situation where discontinuities of the data recording area may occur in a partition when the partition is interrupted by system zones. The controlling software includes routines to allow the host system to choose three options for placing partitions. Two of the options are used to minimize the number of discontinuities in the data recording area of a partition. Under the "Pack Option", a second partition is always placed immediately behind a first partition disregarding the effect of system zones. Under the "Stretch Option", the boundary of the previously formatted partition is extended to the boundary of the system zone, and the next partition begins on the end-of-tape side of the system zone. Finally, under the "Waste Option", the area between the end of the last completely formatted partition and the beginning of the system zone is left unformatted and no data may be stored in this area. The next partition begins on the end-of-tape side of the system zone.

BRIEF DESCRIPTION OF THE DRAWINGS

For a more complete understanding of the present invention and the advantages thereof, reference is now made to the following detailed description taken in conjunction with the accompanying drawings in which.

DETAILED DESCRIPTION OF THE INVENTION

Figure 1:
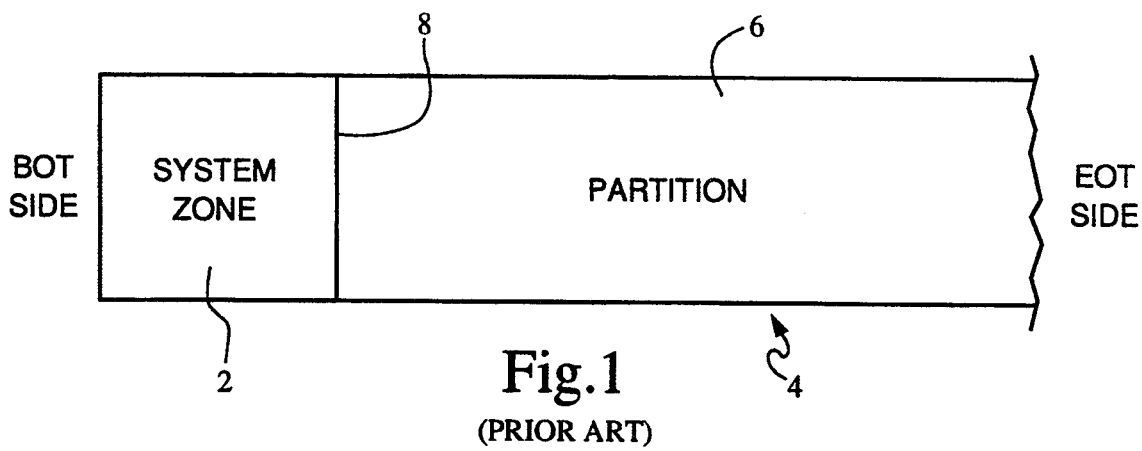
FIG. 1 is a diagram of the prior art method for volume formatting.

Referring now to the drawings, and more particularly to FIG. 1 wherein there is shown an illustration of the prior art formatting of the length of a magnetic tape for data storage. Under prior methods, a single system zone 2 is placed at the beginning of a magnetic tape 4. This zone contains the information necessary for system use during loading and threading operations. The system zone 2 is immediately followed by a single partition 6 starting at the beginning of media (BOM) and continuing until the end-of-media warning (EMW). The area for user data storage begins at the partition boundary 8.

In the present invention, at the beginning of the format procedure, the controlling software instructs a peripheral recording device to prompt a host computer system for the desired number of system zones and for the tape length interval between the system zones. System zones are fixed-length areas on tape, occurring at regular intervals, which are reserved for system use. The system zones are formatted onto the magnetic tape by the peripheral recording device as indicated by the responses of the host computer system. Once the plurality of system zones have been formatted onto the tape, system loading and threading operations may be carried out at any of the system zones. The peripheral recording device and the host computer system are conventional hardware and do not form a part of the present invention.

Figure 2:
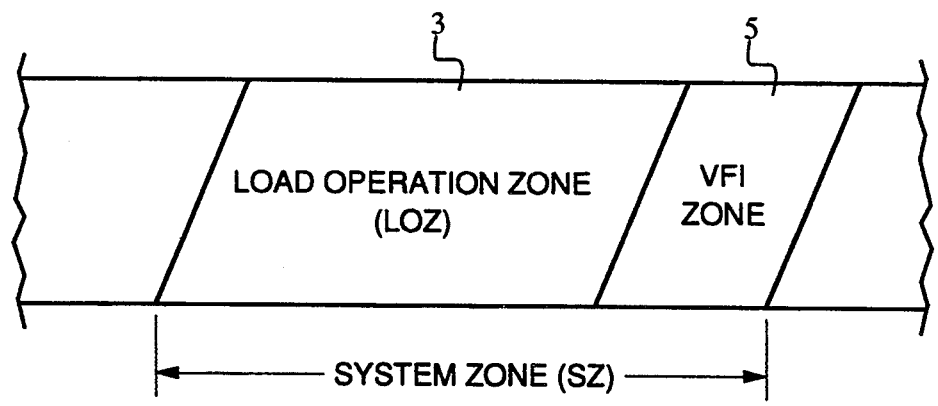
FIG. 2 is a diagram of the format of a system zone on a magnetic tape.

The format of a system zone is illustrated in FIG. 2. The system zone is comprised of two areas. The Load Operation Zone (LOZ) 3 is used during loading and unloading of the tape from a peripheral recording device. The Volume Format Information Zone (VFI) 5 is an area containing information on the data volume format. This information allows the peripheral recording device to locate any partition on the magnetic tape. All system zones contain substantially identical information.

At the same time the system zones are being formatted, the magnetic tape is also being formatted with a plurality of partitions. This process is initiated by a prompt from the controlling software of the peripheral recording device to the host computer system requesting the number of partitions and the length of partitions to be formatted onto the magnetic tape. The software also instructs the peripheral recording device to request the host computer system to choose a Pack, Waste, or Stretch format option. The software then formats partitions onto the tape in accordance with the responses received from the host computer system. The first partition is formatted starting at the Physical Beginning of Medium (PBOM) and may be immediately followed by the next partition or a system zone.

Figure 3:
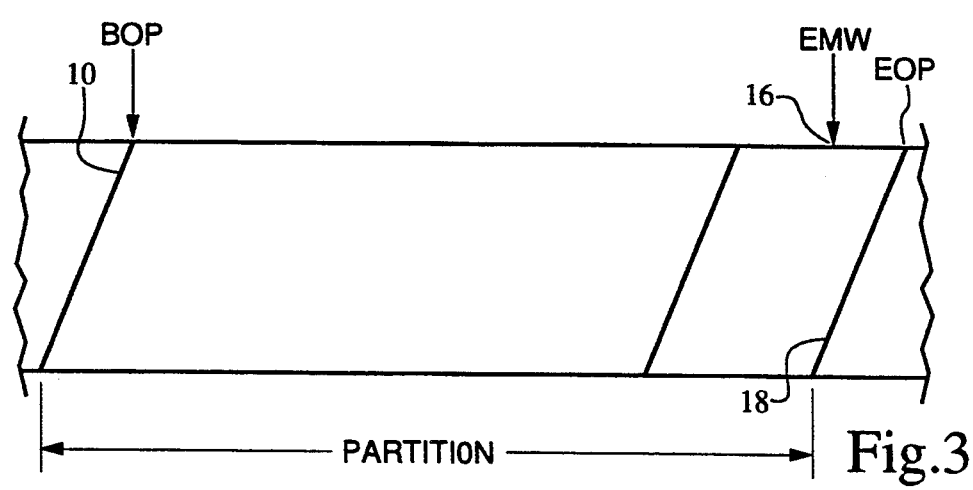
FIG. 3 is a diagram of the format of a partition on a magnetic tape.

Referring to FIG. 3, there is shown the general format of a partition. The beginning of partition (BOP) 10 is a location on the tape that denotes the physical beginning of a partition. The BOP 10 is not an actual recording area on the tape but indicates the first track of the beginning of the partition.

The end of media warning (EMW) 16 is a recording area that contains a warning recording to be sent to the peripheral recording device when there is an attempt to record data in the area. This notifies the recording device that available recording area on the partition is about the end.

The end of partition (EOP) 18 is a location on the tape denoting the physical end of a partition. There is no recorded or physical marking of EOP 18 on a tape. The data track after the last data track of a partition is considered the EOP 18. Therefore, if two partitions are physically adjacent, the BOP 10 of the second partition also denotes the EOP 18 of the previous partition.

Figure 4:
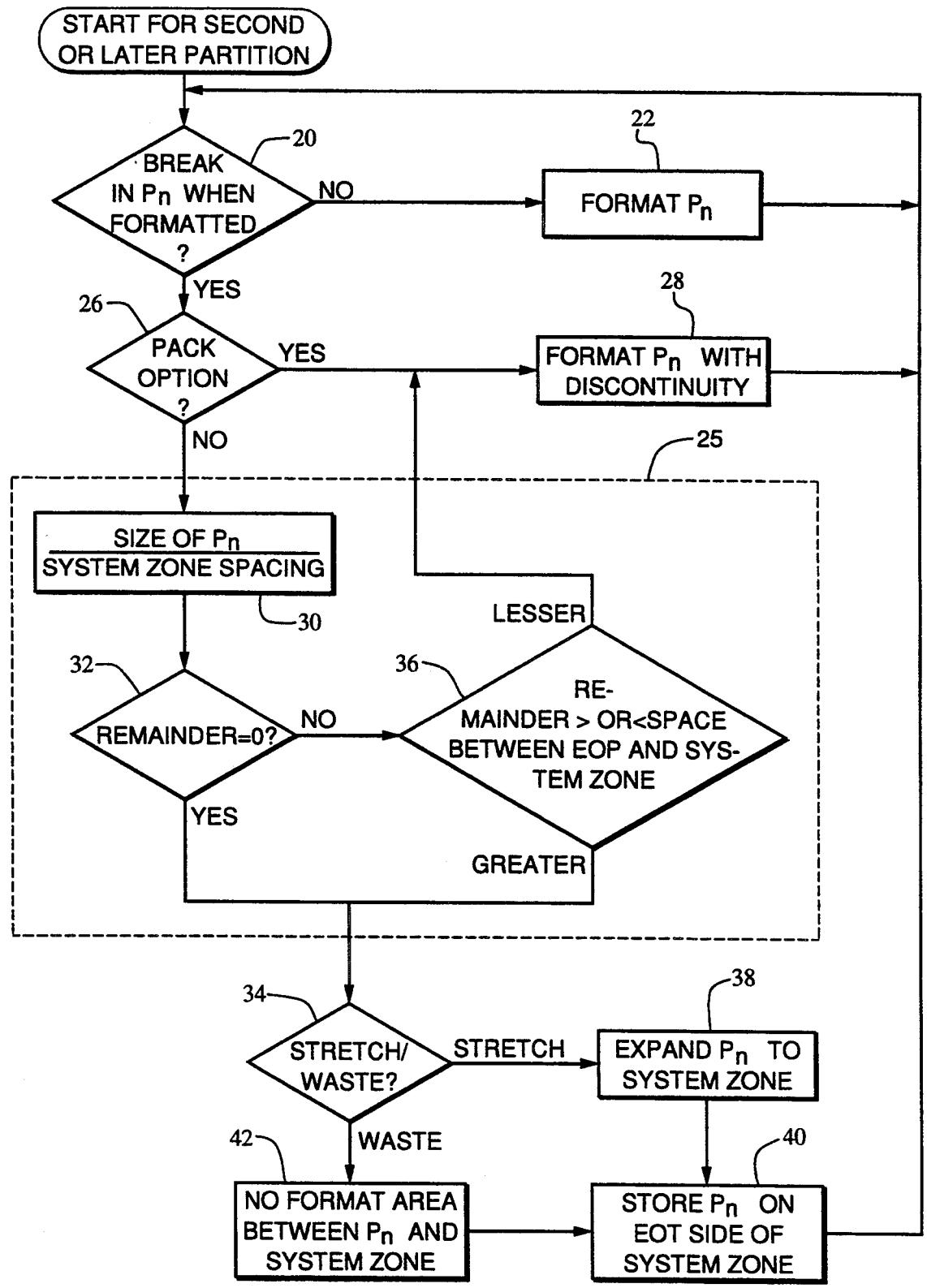
FIG. 4 is a flow diagram of the process for formatting a partition located across a system zone.

During the formatting of the second and later partitions, a condition may arise where a partition ($P_n$) will be formatted across an area of tape containing a system zone. The procedure for responding to this condition is illustrated by FIG. 4. When a new partition ($P_n$) is to be formatted onto the magnetic tape, the host computer system makes a determination at step 20 as to whether the formatting of $P_n$ will cause a discontinuity in the partition. If the formatting of a partition will not cause a discontinuity, $P_n$ is formatted onto the tape at step 22 and the recorder then returns the partitioning sequence to the step 20 to attempt to format the next partition.

If the formatting of $P_n$ will cause a discontinuity in the partition, the controlling software determines at step 26 whether the host system has chosen the Pack Option, which will be discussed more fully later. If the Pack Option has been chosen, the partition is formatted across the system zones at step 28 such that the partition consists of two segments on either side of each system zone. The recording device then attempts to format the next partition and returns to step 20.

If the Waste or Stretch options, which will be more fully discussed later, were chosen the routine for partitioning begins a series of Partition Optimization Steps 25 designed to minimize the number of system zone interruptions for any single partition. The first step 30 divides the size of the Partition by the system zone spacing specified by the host computer system to generate a partition remainder. An inquiry 32 is then made to determine if the remainder is equal to zero. If the remainder is equal to zero, the Partition Optimization Steps 25 are completed and control will pass to step 34.

If the remainder generated at step 30 does not equal zero, the routine determines at step 36 if the remainder is greater than or less than the area remaining between the end of partition (EOP) 18 of the previous partition and the boundary of the next system zone. If the remainder from step 30 is less than the area remaining between the EOP 18 of the previous partition and the system zone, the Partition Optimization Steps 25 are exited and control passes to step 28 where the partition is formatted across the system zone and then seeks to format the next partition by returning to step 20. If the remainder is greater than the area remaining between EOP 18 of previous partition and the system zone, the Partition Optimization Steps 25 are exited and control passes to step 34.

The function of the Partition Optimization Steps 25 is to determine if the partition is to be formatted with a discontinuity despite a choice by the host computer system of the Stretch or Waste option or if the partition is to be formatted on the end-of-tape (EOT) side of the system zone. Partitions to be formatted with a discontinuity are passed through step 20 to step 28. Partitions that will be formatted on the EOT side of a system zone pass to step 34.

At step 34 an inquiry is made to determine if the Stretch or Waste option was chosen by the host computer system. If the Stretch option was chosen, the boundary of previous partition is expanded up to the boundary of the system zone at step 38, thus making the previous partition larger by the difference between its original boundary and the boundary of the system zone. The extended area is available for the storage of user data. The next partition is then formatted on the EOT side of the system zone at step 40. An attempt is then made to format the next partition by returning to step 26.

If the Waste option was chosen at step 34, the area between the previous partition and the system zone is not formatted as a result of step 42. Therefore, the area is unavailable for data storage and is wasted. The next partition is then formatted on the EOT side of the system zone at step 40 and control passes to step 26.

Figure 5:
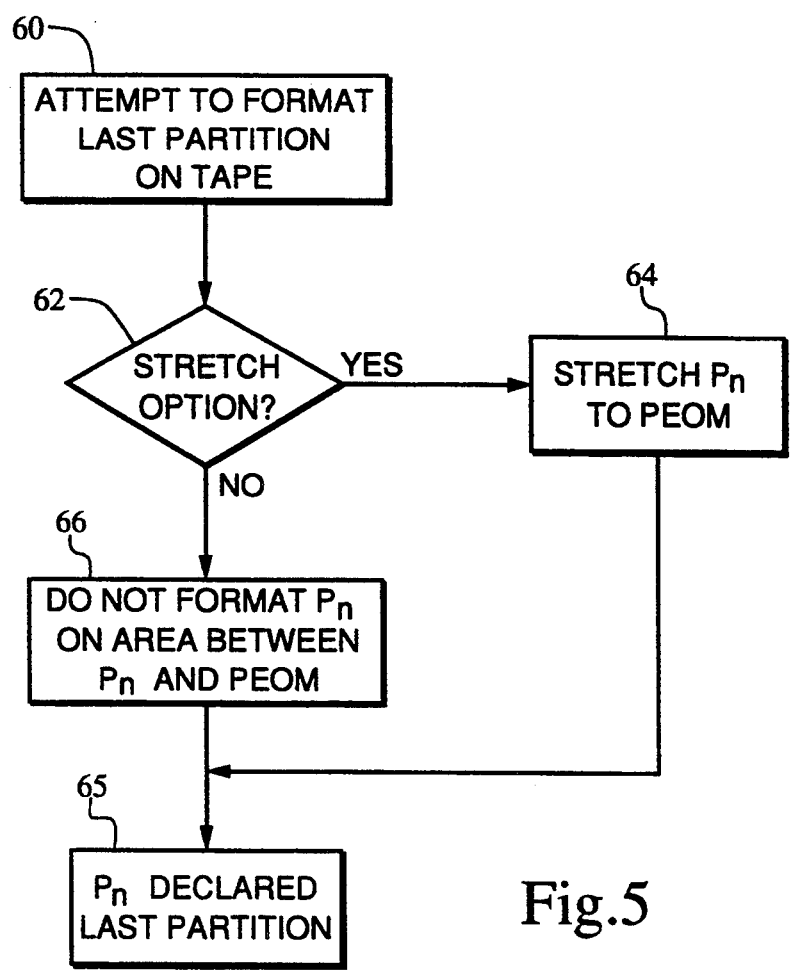
FIG. 5 is a flow diagram of the process to format the last partition at the end of a magnetic tape.

Referring to FIG. 5, there is illustrated the routine run when the last partition $P_n$ on the tape cannot be completely formatted in the area between the EOP 18 of the previous partition and the physical end of the tape medium (PEOM). When a command is received at step 60 to format the last partition $P_n$ that cannot be completely formatted in the remaining tape area, an inquiry 62 is made to determine if the Stretch option was chosen by the host computer system. If the Stretch option was chosen, the last partition $P_n$ is not formatted at the end of the tape and the boundary of the previous partition is expanded at step 64 to the PEOM making this area available for data storage. The expanded partition is then declared the last partition on the volume at step 65. If the Pack or Waste option was specified, the area between the EOP 18 of the previous partition and the PEOM is not formatted (step 66) and is not available for data storage. The previous partition is then declared the last partition on the volume at step 65.

Under normal circumstances, the system zones will be formatted onto the tape at the spacing specified by the host computer system. However, a condition may occur near the PEOM if a requested system zone cannot be completely formatted in the area between the last partition and the physical end of the medium. The procedure for responding to this condition is illustrated in FIG. 6.

Figure 6:
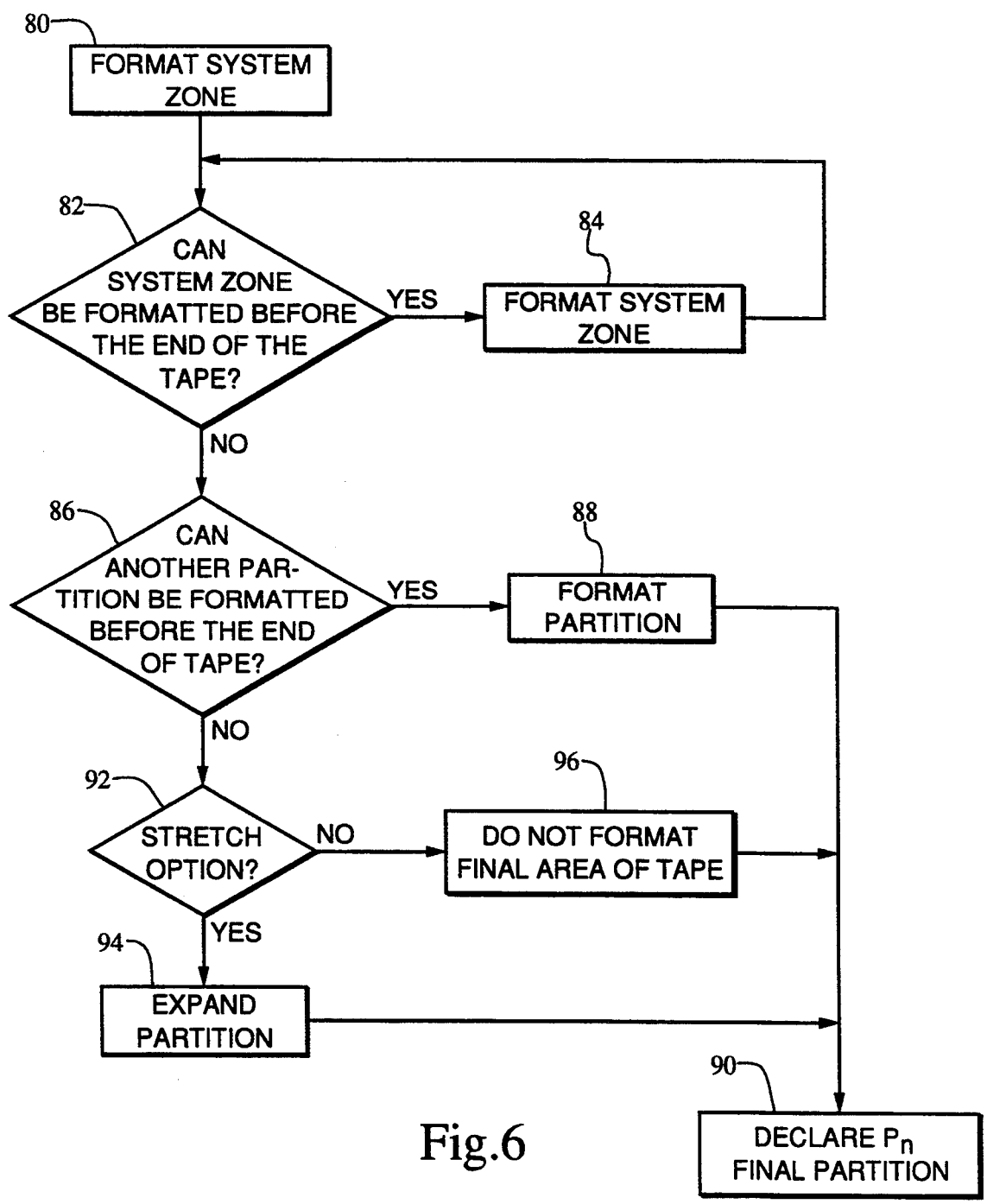
FIG. 6 is a flow diagram of the process to format a system zone which would extend beyond the end of the magnetic tape.

Referring to FIG. 6, when a command is received to format a system zone at step 80, an inquiry 82 is made to determine if the system zone can be completely formatted before the PEOM. If sufficient area is available to format the zone, the system zone is formatted at step 84 and the routine returns to inquiry 82 to format the next partition. If there is not enough space before the PEOM for another system zone, an inquiry 86 determines if another partition $P_n$ can be formatted after the previous partition.

If there is a space available to format other complete partitions on the end of the tape, these are formatted at steps 86 and 88. Once a complete partition cannot be formatted on the tape, an inquiry 92 is made to determine if the Stretch option was specified.

If the Stretch option was specified, the boundary of the last partition is extended at step 94 to the PEOM, and the partition is declared at step 90 the last partition on the tape. If the Pack or Waste option was specified, the final area of tape is not formatted (step 96) and is not available for data storage. The previously formatted partition is then declared the final partition on the tape at step 90.

Figure 7A:
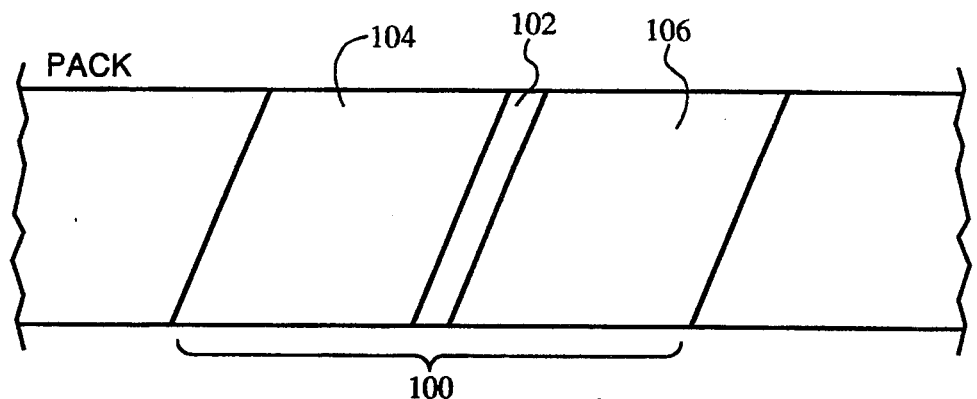
FIG. 7A, 7B and 7C illustrate the Pack, Waste and Stretch volume format options, respectively.
Figure 7B:
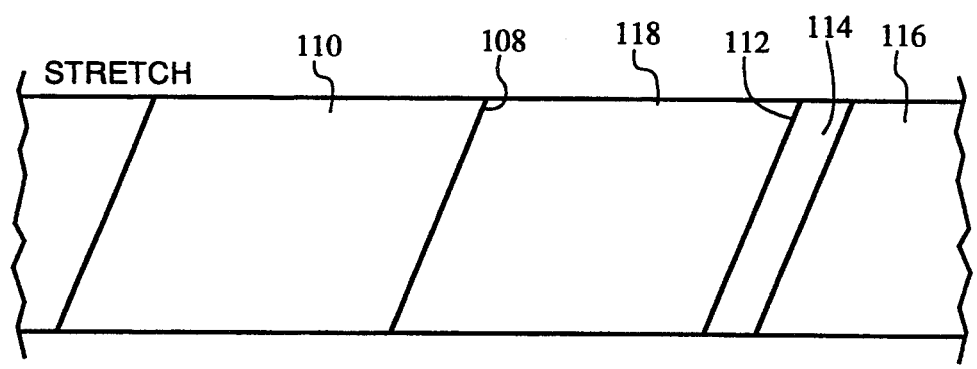
Figure 7C:
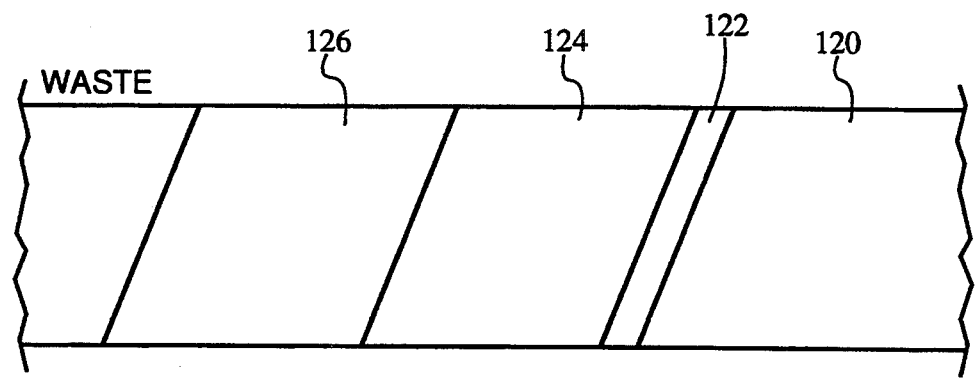

Referring to FIG. 7, there is illustrated the three different option formats for formatting when discontinuities in partitions may occur. When the Pack Option is chosen by the host computer system, the partition 100 is formatted on both sides of the system zone 102 such that the partition consists of two segments 104 and 106. When a Stretch Option is used, the EOP boundary 108 of the last formatted partition 110 is extended to the boundary 112 of the system zone 114. The next partition 116 is then formatted immediately after the system zone 114. This format increases the storage area of the partition 110 by the expanded area 118. Finally, when the Waste option is chosen and a partition discontinuity occurs, the next partition 120 is formatted on the EOT side of the system zone 122. The area 124 between the last formatted partition 126 and the system zone 122 is left unformatted and is not available for user data storage.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention.

We claim:

1. A method for formatting a length of recording media with a plurality of partitions, comprising the steps of:
   formatting a plurality of system zones along the length of the recording media, the system zones spaced apart by one or more of the partitions;
   selecting a length for each partition; and
   formatting one or more partitions along the length of recording media between each of the spaced apart system zones, including the steps of:
   determining when a to be formatted partition overlaps a system zone;
   dividing the partition into first and second segments when a to be formatted partition overlaps a system zone; and
   formatting the first segment before the zone and formatting the second segment after the system zone.

2. A method for formatting a length of recording media with a plurality of partitions for recording data, comprising the steps of:
   formatting a plurality of system zones along the length of the recording media, the system zones spaced apart by one or more of the partitions;
   selecting a length for each partition; and
   formatting one or more partitions along the length of recording media between each of the spaced apart system zones, including the steps of:
   determining when a next to be formatted partition overlaps a system zone;
   extending the length of a prior partition up to the system zone when the next to be formatted partition overlaps a system zone; and
   formatting the next to be formatted partition after the system zone.

3. The method as in claim 2 further including the steps of:
   dividing the size of the next to be formatted partition by a distance between the spaced apart system zones to identify a partition remainder;
   testing if the partition remainder is less than a length between a previously formatted partition and a next system zone; and
   when the remainder is less, skipping the steps of extending the length and formatting the next partition, and then:
   dividing the next partition into first and second segments; and
   formatting the first segment before the system zone and formatting the second segment after the system zone.

4. A method for formatting a length of recording media with a plurality of partitions for recording data, comprising the steps of:
   formatting a plurality of system zones along the length of the recording media, the system zones spaced apart by one or more of the partitions;
   selecting a length for each partition; and
   formatting one or more partitions along the length of recording media between each of the spaced apart system zones, including the steps of:
   determining when a next to be formatted partition overlaps a system zone; and
   formatting the next partition to begin after the system zone if the next partition overlaps a system zone.

5. The method as in claim 4 further including the steps of:
   dividing the size of the next to be formatted partition by a distance between the spaced apart system zones to identify a partition remainder;
   testing if the partition remainder is less than a length between a previously formatted partition and a next system zone; and
   when the remainder is less, skipping the step of formatting the next partition, and then:
   dividing the next partition into first and second segments; and
   formatting the first segment before the system zone and formatting the second segment after the system zone.

* * * * *

UNITED STATES PATENT AND TRADEMARK OFFICE
CERTIFICATE OF CORRECTION

PATENT NO. : 5,388,012
DATED : February 7, 1995
INVENTOR(S) : Stephen M. Adams and Lionel C. Shih It is certified that error appears in the above-indentified patent and that said Letters Patent is hereby corrected as shown below:

Col. 6, line 4, after the second occurrence "the", insert --system--.

Signed and Sealed this

Seventh Day of November, 1995

Attest:

BRUCE LEHMAN

*Attesting Officer*  *Commissioner of Patents and Trademarks*